Oct. 18, 1960

E. S. KELSEY 2,957,039

WIRE TRANSPOSING MEANS

Filed Sept. 2, 1958

Inventor
E. S. KELSEY

By Robert B. Harmon

Attorney 2,957,039
Patented Oct. 18, 1960

2,957,039

WIRE TRANSPOSING MEANS

Ernest S. Kelsey, Lachine, Quebec, Canada, assignor to Northern Electric Company, Limited, Montreal, Quebec, Canada, a corporation of Canada Filed Sept. 2, 1958, Ser. No. 758,532

3 Claims. (Cl. 174—33)

This invention relates to the art of transposing circuit wires and more particularly to the method of and the apparatus for transposing open wires of telephone or telegraph systems.

It is well known that telephone, telegraph and other like circuits are often interfered with by induction from other circuits. It is also well known that it is customary to transpose wires of these circuits at certain intervals, so as to equalize inductive effects, by means of transposition brackets positioned on the pole or inserted in the span of circuit wires. Such brackets when placed on the span are generally heavy, and are affected by winds since they have a considerable area, so that the circuit wires of the span may be subject to considerable vibrational stress.

It is an object of this invention to provide a transposition link which is light in weight and comparatively of small cross sectional area.

It is another object of this invention to provide a transposition link having the foregoing characteristics which is economical to manufacture.

It is a further object of this invention to provide an improved method of transposing circuit wires.

These and other objects of the invention are attained by providing a link, capable of being inserted in a span of circuit wires of a telephone or like system, consisting of mechanical-coupling means individually inserted in each conductor of the pair to be transposed in order to electrically insulate each conductor in one transposition section from the collinearly located conductor in the preceding or succeeding section, in combination with conductive means connected between diagonally opposite sections of the mechanically coupled conductors, thus transposing the circuit pair.

Figure 1:
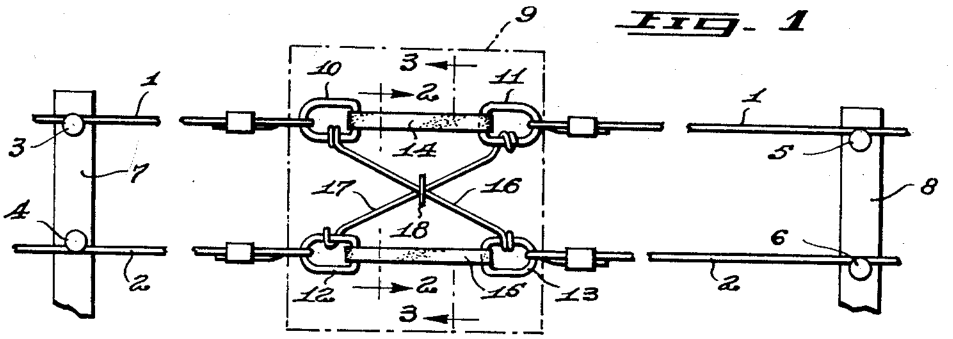
Figures 2, 3:
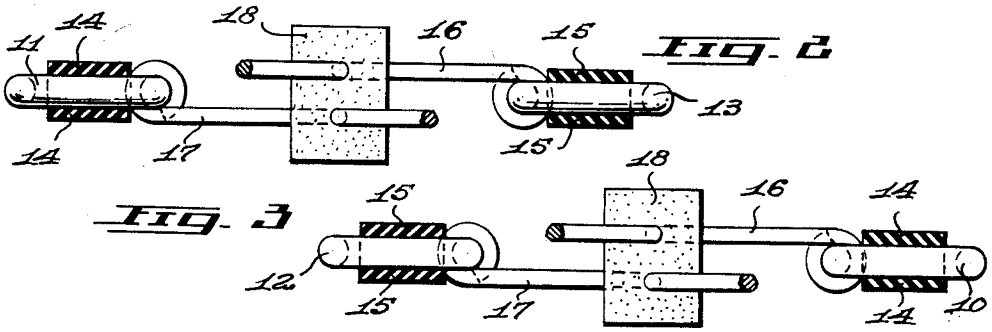
Figure 4:
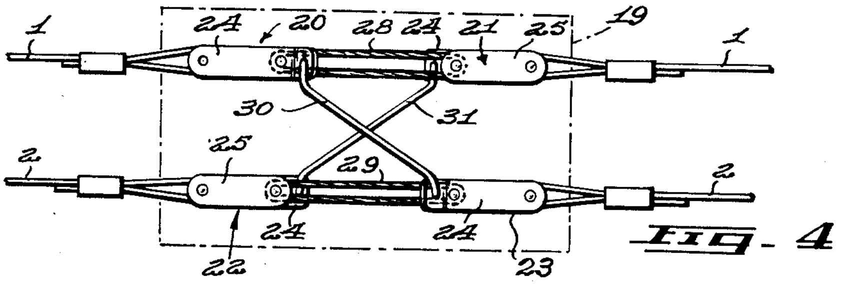
Figure 5:
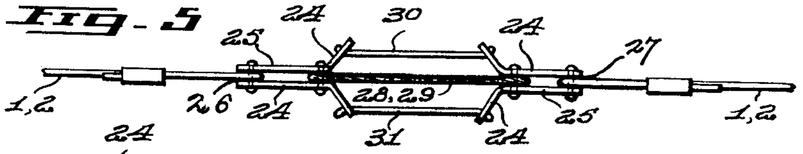
Figure 6:
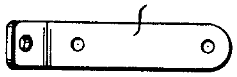
Figure 7:
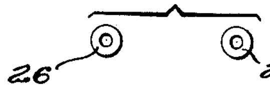
Figure 8:
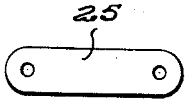

A better understanding of the invention may be attained by referring to the following description, taken in conjunction with the accompanying drawings, in which like numbers refer to like parts, showing embodiments of the invention, in which:

Fig. 1 is a plan view of a telephone or other circuit showing one embodiment of the link inserted therein for the transposing of the circuit conductors in accordance with the invention;

Figs. 2 and 3 are views taken in sections 2—2 and 3—3 of Fig. 1 taken in the direction of the arrows;

Figs. 4 and 5 show a plan and elevation view respectively of another embodiment of the invention; and Figs. 6, 7 and 8 show plan views of the coupling elements employed in the embodiment illustrated in Figs. 4 and 5.

Considering Fig. 1, there is shown a pair of line wires 1, 2, respectively attached to insulators 3, 4 and 5, 6 on cross arms 7 and 8; a link 9 comprising a pair of mechanically-coupling, electrically-insulating means, each consisting of two identical coupling elements 10, 11 and 12, 13 joined together by a moisture repellant electrical insulating material of high tensile strength 14 and 15, respectively, individually inserted in line wires 1 and 2 respectively, in combination with a pair of transposing conductive elements 16 and 17 connected to coupling elements 10, 11 and 12, 13 respectively, so that a transposed connection is made between line conductors 1 and 2. Insulating element 18 through which conductors 16 and 17 are threaded ensures that they will not come into contact with each other. As an alternative arrangement, insulated wires may be used for 16 and 17, in which case insulator 18 may be omitted. The coupling elements 10, 11, 12 and 13 may be made from a light electrically conducting material of high tensile strength such as a magnesium or aluminum alloy. The transposing elements 16 and 17 are not under mechanical stress and are attached to coupling elements 10, 11, 12 and 13 by any suitable means for making a good electrical connection. The preferred method of attaching the line wires 1 and 2 to coupling elements 10, 11, 12, 13 is by means of one of the well known types of rolled or pressed sleeves used for making dead-end line-wire connections.

In the embodiment shown in Figs. 4 to 8, inclusive, the link 19 consists of coupling elements 20, 21 and 22, 23 which perform the same functions as coupling elements 10, 11 and 12, 13 of Fig. 1 but are designed for fabrication from two formed parts and two spacers, illustrated in Figs. 6 to 8 where 24 and 25 are the formed parts and 26 and 27 are the spacers. Components 28 and 29 are flexible loops fabricated from an electrical insulating material of high tensile strength such as nylon, suitably treated to be moisture repellant. The two mechanically-coupling, electrically-insulating assemblies comprised of elements 20, 21 and 28 and elements 22, 23 and 29 are assembled by suitable means such as by rivets with part 24 above part 25 in coupled components 20 and 23 and with part 24 below part 25 in coupling components 21 and 22. The transposing conductive elements 30 and 31 connect respectively, the bent lugs of part 24 facing upwards in coupling elements 20 and 23 and the bent lugs of parts 24 facing downwards in elements 21 and 22. This assembly arrangement ensures a vertical separation between conductive elements 30 and 31 when the elements 20, 28 and 21 and the elements 22, 29 and 23, are held in line under the tension of line wires 1 and 2 respectively.

It will be apparent that many other embodiments are possible in the spirit of this invention, namely, to provide two insulating connections capable of supporting the mechanical stress due to line tension and two electrical connections free from mechanical stress to furnish the diagonally connected conductors necessary for the electrical transposition between the line wires.

What is claimed is:

1. A means for transposing paired tensioned circuit wires comprising, a linking means capable of being inserted in a span of circuit wires consisting in combination: a connecting means individually inserted in each circuit wire consisting of a pair of apertures, metallic connecting means spaced apart and connected together by a high tensile strength moisture repellant insulating material, a conductive wire receiving means mounted on connecting means, a conductive means individually connected from a wire receiving means on one of the connecting means to the diagonally opposite wire receiving means on the respective connecting means, the wire receiving means being disposed on the connecting means so that the conductive means are at different levels to each other.

2. A linking device in accordance with claim 1 in which said connecting means are made from the group consisting of magnesium, aluminum or their alloys.

3. A means for transposing paired tensioned circuit wires comprising: a linking means capable of being inserted in a span of circuit wires consisting in combination, connecting means individually inserted in each circuit wire consisting of a pair of plate-like apertured non-corrosive metallic connecting means, spaced apart and connected together by a high tensile strength moisture repellant insulating material, having a portion offset from the plane of its flat surface and provided with wire receiving means, a conductive means individually connected to a wire receiving means on one of the connecting means to the diagonally wire receiving means on the respective elements, wire receiving means being disposed so that the conductive means are at different levels to each other.

References Cited in the file of this patent

UNITED STATES PATENTS

| | | |
|---|---|---|
| Re. 17,235 | Kirke et al. | Mar. 12, 1929 |
| 710,206 | O'Brien et al. | Sept. 30, 1902 |
| 731,239 | Sorg | June 16, 1903 |
| 2,862,990 | Case | Dec. 2, 1958 |